United States Patent
Yamaguchi et al.

(10) Patent No.: US 8,125,701 B2
(45) Date of Patent: Feb. 28, 2012

(54) OPTICAL SWITCH

(75) Inventors: Johji Yamaguchi, Kanagawa (JP); Naru Nemoto, Kanagawa (JP); Shingo Uchiyama, Kanagawa (JP); Tsuyoshi Yamamoto, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 240 days.

(21) Appl. No.: 12/441,895

(22) PCT Filed: Sep. 28, 2007

(86) PCT No.: PCT/JP2007/069092
§ 371 (c)(1), (2), (4) Date: Mar. 18, 2009

(87) PCT Pub. No.: WO2008/044506
PCT Pub. Date: Apr. 17, 2008

(65) Prior Publication Data
US 2010/0020378 A1 Jan. 28, 2010

(30) Foreign Application Priority Data
Oct. 11, 2006 (JP) .................. 2006-277985

(51) Int. Cl.
G02B 26/08 (2006.01)
(52) U.S. Cl. ............ 359/221.2; 359/200.6; 385/22
(58) Field of Classification Search .... 359/198.1–199.4, 359/200.6–200.8, 202.1, 221.2, 223.1–225.1, 359/226.2, 290–295, 838, 846, 871, 872; 250/204, 559.06, 559.29, 230, 234; 347/255–260; 353/39, 98–99; 385/15–18, 22; 398/12, 398/19, 45
See application file for complete search history.

(56) References Cited

U.S. PATENT DOCUMENTS

| | | | |
|---|---|---|---|
| 6,657,771 B2 * | 12/2003 | Okayama | 359/290 |
| 2005/0286891 A1 * | 12/2005 | Sakai et al. | 398/45 |
| 2006/0228070 A1 * | 10/2006 | Davis et al. | 385/16 |
| 2010/0020378 A1 * | 1/2010 | Yamaguchi et al. | 359/221.2 |

FOREIGN PATENT DOCUMENTS

| | | |
|---|---|---|
| JP | 2002-236264 A | 8/2002 |
| JP | 2003-029171 A | 1/2003 |
| JP | 2005-181580 A | 7/2005 |
| JP | 2005-189548 A | 7/2005 |

OTHER PUBLICATIONS

Yamamoto, et al., "A Three-Dimensional MEMS Optical Switching Module Having 100 Input and 100 Output Ports", Photonics Technology Letters, IEEE, vol. 15, Issue:10, pp. 1360-1362.

* cited by examiner

Primary Examiner — Jennifer L. Doak
(74) Attorney, Agent, or Firm — Blakely, Sokoloff, Taylor & Zafman

(57) ABSTRACT

A detection means (52) detects optimum driving voltages of a mirror device. A correction means (53) corrects driving voltage values in a table (54b) based on the optimum driving voltages. This makes it possible to drive the mirror to an optimum pivot angle even when the optimum pivot angle of the mirror changes due to, e.g., mirror drift or a change in the environment such as temperature.

11 Claims, 13 Drawing Sheets

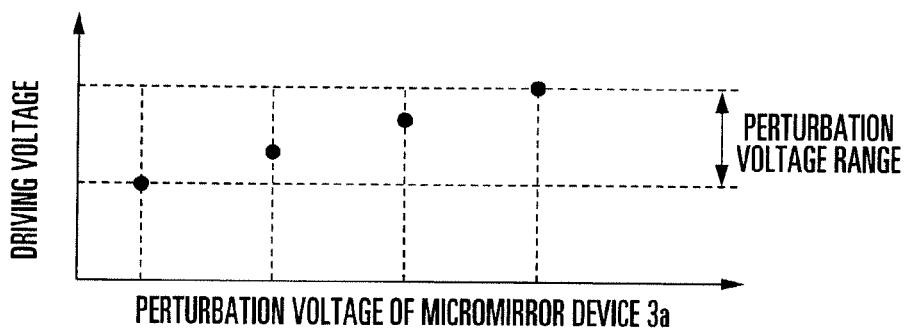
FIG. 2A
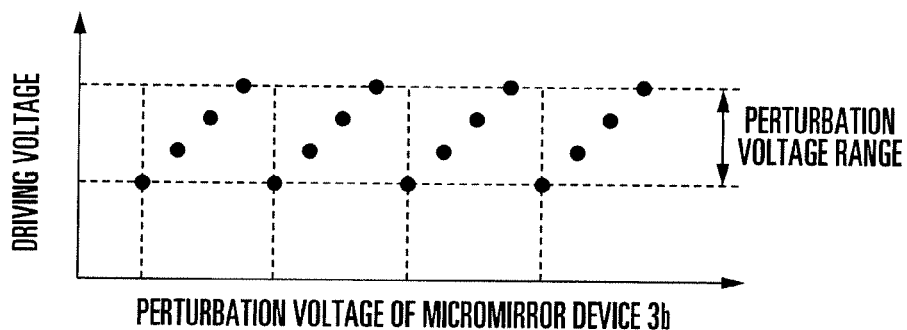
FIG. 2B
| 3a\3b | α | β | γ | δ | ε | ζ | ..... |
|---|---|---|---|---|---|---|---|
| A | 1 | 2 | 3 | 4 | 5 | 6 | ..... |
| B | 11 | 12 | 13 | 14 | 15 | 16 | ..... |
| C | 21 | 22 | 23 | 24 | 25 | 26 | ..... |
| D | 31 | 32 | 33 | 34 | 35 | 36 | ..... |
| E | 41 | 42 | 43 | 44 | 45 | 46 | ..... |
| F | 51 | 52 | 53 | 54 | 55 | 56 | ..... |
| ⋮ | ⋮ | ⋮ | ⋮ | ⋮ | ⋮ | ⋮ | |
FIG. 3

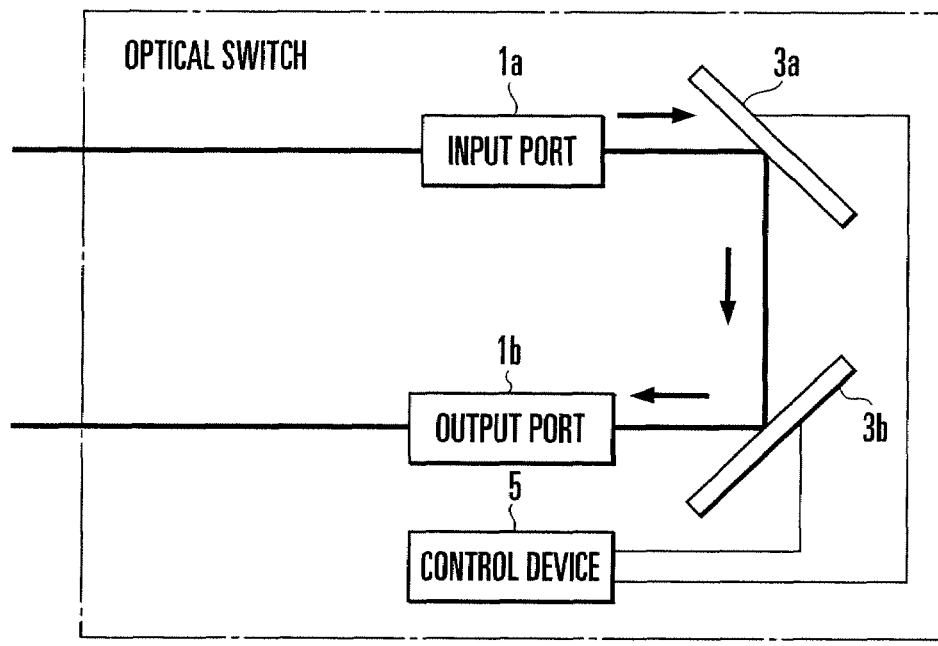
F I G. 8A
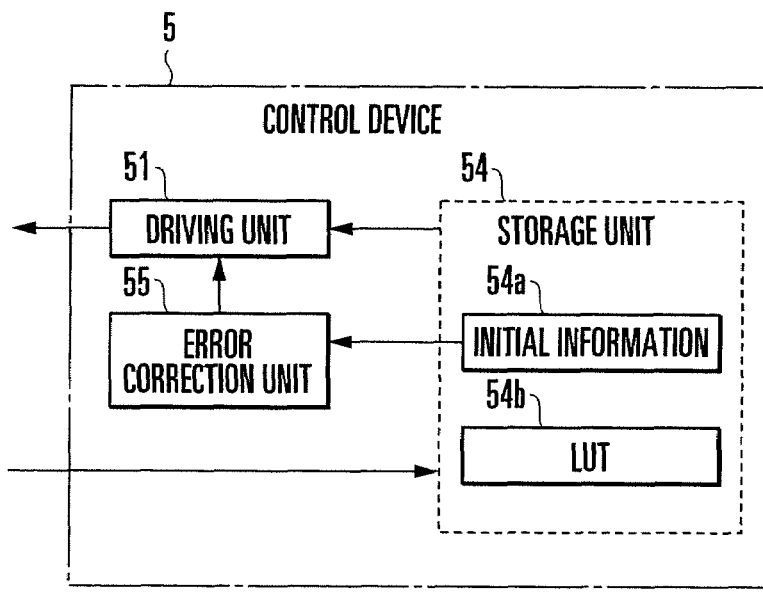
F I G. 8B

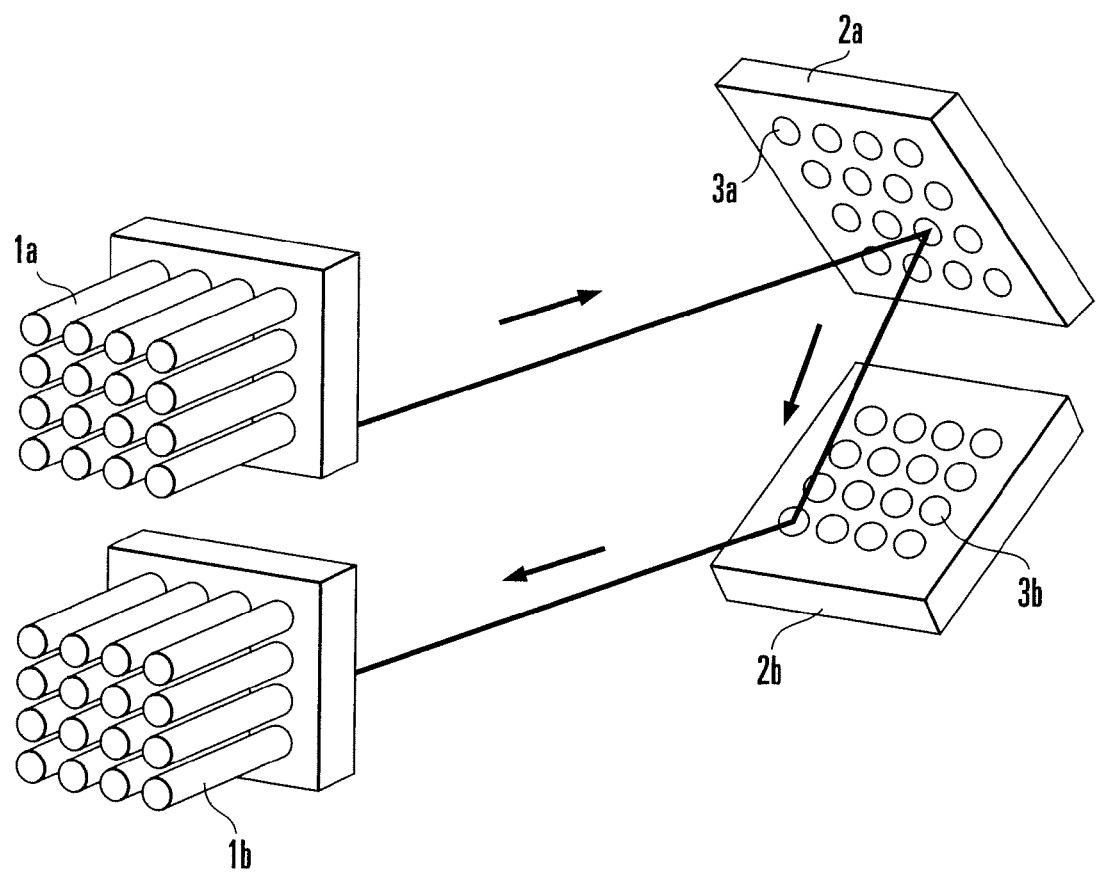
F I G. 15

OPTICAL SWITCH

The present patent application is a Utility claiming the benefit of Application No. PCT/JP2007/069092, filed Sep. 28, 2007.

TECHNICAL FIELD

The present invention relates to an optical switch.

BACKGROUND ART

A technique of implementing an optical switch using a micromirror has been proposed (T. Yamamoto, et al., "a three-dimensional MEMS optical switching module having 100 input and 100 output ports", Photonics Technology Letters, IEEE, Volume 15, Issue: 10, pp. 1360-1362). FIG. 15 shows a conventional optical switch using a micromirror.

The optical switch shown in FIG. 15 includes input ports 1a, output ports 1b, input-side micromirror array 2a, and output-side micromirror array 2b. Each of the input ports 1a and output ports 1b includes a plurality of optical fibers arrayed two-dimensionally. Each of the micromirror arrays 2a and 2b includes a plurality of micromirror devices 3a and 3b arrayed two-dimensionally. The arrows in FIG. 15 indicate a light beam traveling direction.

An optical signal which has exited from a given input port 1a is reflected and deflected by a micromirror device 3a of the input-side micromirror array 2a corresponding to the input port 1a. As will be described later, the mirror of the micromirror device 3a is designed to pivot about two axes so as to direct light reflected by the micromirror device 3a to an arbitrary micromirror device 3b of the output-side micromirror array 2b. The mirror of the micromirror device 3b is also designed to pivot about two axes so as to direct light reflected by the micromirror device 3b to an arbitrary output port 1b by appropriately controlling the tilt angle of the mirror. It is therefore possible to switch the optical path and connect arbitrary two of the input ports 1a and output ports 1b arrayed two-dimensionally by appropriately controlling the tilt angles of mirrors in the input-side micromirror array 2a and output-side micromirror array 2b.

The most characteristic constituent elements of the optical switch are the micromirror devices 3a and 3b included in the micromirror arrays 2a and 2b. In a micromirror device, conventionally, a mirror substrate 200 having a mirror and an electrode substrate 300 having electrodes are arranged in parallel, as shown in FIGS. 16 and 17 (see the above-described reference).

The mirror substrate 200 includes a plate-shaped frame portion 210, a gimbal 220 arranged in the opening of the frame portion 210, and a mirror 230 arranged in the opening of the gimbal 220. The frame portion 210, torsion springs 211a, 211b, 221a, and 221b, the gimbal 220, and the mirror 230 are integrally formed from, e.g., single-crystal silicon. For example, a Ti/Pt/Au layer having a three layer structure is formed on the surface of the mirror 230. The pair of torsion springs 211a and 211b connect the frame portion 210 to the gimbal 220. The gimbal 220 can pivot about a gimbal pivot axis x in FIG. 16 which passes through the pair of torsion springs 211a and 211b. Similarly, the pair of torsion springs 221a and 221b connect the gimbal 220 to the mirror 230. The mirror 230 can pivot about a mirror pivot axis y in FIG. 16 which passes through the pair of torsion springs 221a and 221b. The gimbal pivot axis x and the mirror pivot axis y are perpendicular to each other. As a result, the mirror 230 pivots about the two axes which are perpendicular to each other.

The electrode substrate 300 includes a plate-shaped base portion 310, and a terrace-shaped projecting portion 320. The base portion 310 and the projecting portion 320 are made of, e.g., single-crystal silicon. The projecting portion 320 includes a second terrace 322 having a truncated pyramidal shape and formed on the upper surface of the base portion 310, a first terrace 321 having a truncated pyramidal shape and formed on the upper surface of the second terrace 322, and a pivot 330 having a columnar shape and formed on the upper surface of the first terrace 321. Four electrodes 340a to 340d are formed on the four corners of the projecting portion 320 and the upper surface of the base portion 310 led out of the four corners. A pair of projecting portions 360a and 360b are formed on the upper surface of the base portion 310 to be juxtaposed while sandwiching the projecting portion 320. Interconnections 370 are formed on the upper surface of the base portion 310. The electrodes 340a to 340d are connected to the interconnections 370 via leads 341a to 341d. An insulating layer 311 made of, e.g., silicon oxide is formed on the surface of the base portion 310. The electrodes 340a to 340d, leads 341a to 341d, and interconnections 370 are formed on the insulating layer 311.

The lower surface of the frame portion 210 and the upper surfaces of the projecting portions 360a and 360b are bonded to each other to make the mirror 230 face the electrodes 340a to 340d so that the mirror substrate 200 and the electrode substrate 300 form a micromirror device shown in FIG. 17. In the micromirror device, the mirror 230 is grounded. A positive driving voltage is applied to the electrodes 340a to 340d such that an asymmetrical potential difference is generated between them, thereby attracting the mirror 230 by an electrostatic attraction and making it pivot in an arbitrary direction.

DISCLOSURE OF INVENTION

Problem to be Solved by the Invention

In the conventional optical switch, a control device (not shown) for controlling the tilt angle of the mirror 230 has a table which stores driving voltages for driving the mirrors 230 to necessary pivot angles in correspondence with each combination (to be referred to as a "connection path" hereinafter) of the micromirror devices 3a and 3b to implement an optical path that makes an optical signal from an arbitrary input port 1a output from an arbitrary output port 1b. The control device determines the driving voltages of the mirrors 230 in each connection path upon every switching by looking up the table.

However, an optimum driving voltage for path connection sometimes changes due to mirror drift or a change in the environment such as temperature. Hence, it may be impossible to drive the mirror 230 to an optimum pivot angle only by simply determining the driving voltage of the mirror 230 by looking up the table. If the mirror 230 cannot be driven to an optimum pivot angle, the strength of the optical signal may decrease, resulting in degradation in the communication quality.

The present invention has been made to solve the above-described problem, and has as its object to provide an optical switch capable of driving a mirror to an optimum pivot angle.

Means of Solution to the Problem

In order to solve the above-described problem, according to the present invention, there is provided an optical switch comprising at least one input port which inputs input light, at least one output port which outputs output light, a mirror device which tilts a pivotally supported mirror to a predetermined angle by applying driving voltages, a table which records, in correspondence with each combination of the input port and the output port, the driving voltages to tilt the mirror to a pivot angle at which the input light from one input port is deflected and output from one output port, driving means for selectively outputting, from an arbitrary output port, the input light input to a predetermined input port by supplying the driving voltages to the mirror device while looking up the table, detection means for detecting the driving voltages of the mirror at which power of the output light is optimized, and correction means for correcting the table based on the driving voltages detected by the detection means.

EFFECT OF THE INVENTION

According to the present invention, a mirror driving voltage at which an optimum output light power is obtained is detected, and the table is corrected based on the driving voltage. It is therefore possible to drive the mirror to an optimum pivot angle even when the optimum pivot angle of the mirror changes due to mirror drift or a change in the environment such as temperature.

BRIEF DESCRIPTION OF DRAWINGS

FIG. 2A is a graph showing an example of the perturbation voltage of a micromirror device 3a;

FIG. 2B is a graph showing an example of the perturbation voltage of a micromirror device 3b;

FIG. 3 is a view schematically showing an arrangement example of an LUT;

FIG. 8A is a block diagram schematically showing the arrangement of an optical switch according to the second embodiment of the present invention;

FIG. 8B is a block diagram schematically showing the arrangement of a control device;

FIG. 15 is a perspective view schematically showing the arrangement of an optical switch;

BEST MODE FOR CARRYING OUT THE INVENTION

First Embodiment

Figure 1A:
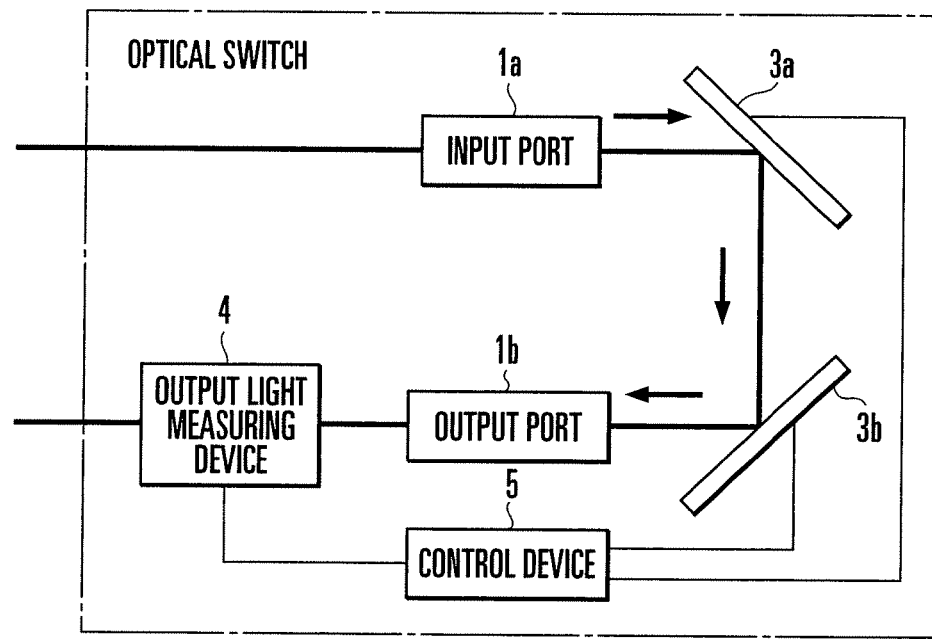
FIG. 1A is a block diagram schematically showing the arrangement of an optical switch according to the first embodiment of the present invention.

The first embodiment of the present invention will now be described with reference to the accompanying drawings. The same names and reference numerals as in "Background Art" described with reference to FIGS. 15 to 17 denote the same constituent elements in this embodiment, and a description will be omitted as needed.

<Arrangement of Optical Switch>

As shown in FIG. 1A, an optical switch according to this embodiment includes an input port 1a, output port 1b, input-side micromirror device 3a, output-side micromirror device 3b, output light measuring device 4, and control device 5.

The output light measuring device 4 detects the intensity of output light which has exited from the output port 1b and converts it into an electrical signal. The output light measuring device 4 can have an arrangement for extracting part of output light and measuring the output light intensity using a light-receiving element such as a photodiode.

Figure 1B:
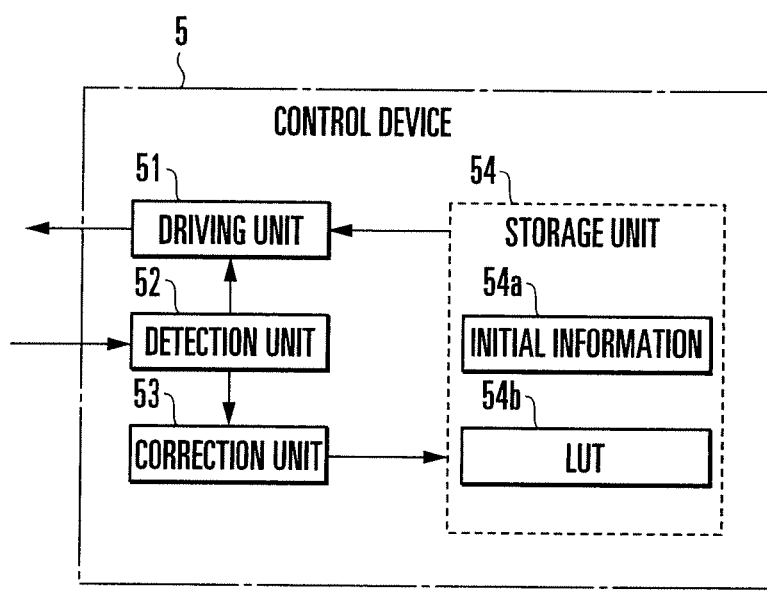
FIG. 1B is a block diagram schematically showing the arrangement of a control device.

The control device 5 supplies driving voltages to the micromirror devices 3a and 3b to tilt mirrors 230 to predetermined angles. The control device 5 also gives a very small variation to the driving voltages to perturb the mirrors 230, thereby obtaining the optimum driving voltages of the micromirror devices 3a and 3b. The control device 5 includes a driving unit 51, detection unit 52, correction unit 53, and storage unit 54, as shown in FIG. 1B.

The driving unit 51 acquires the driving voltage values of the micromirror devices 3a and 3b necessary for a connection path by looking up an LUT (Look Up Table) 54b (to be described later) stored in the storage unit 54, and supplies the driving voltages to the corresponding micromirror devices 3a and 3b, thereby tilting the mirrors 230 to predetermined angles. The driving unit 51 also gives a very small variation to the driving voltages to perturb the mirrors 230 based on an instruction from the detection unit 52.

The detection unit 52 outputs an instruction to the driving unit 51 to perturb the mirrors 230, and detects the optimum driving voltages of the micromirror devices 3a and 3b from the measurement result of the output light measuring device 4 at that time. The driving voltages are input to the driving unit 51 and the correction unit 53. An example of the method of detecting the optimum driving voltages will be described with reference to FIGS. 2A and 2B.

As shown in FIGS. 2A and 2B, the ranges of driving voltages (to be referred to as perturbation voltage ranges hereinafter) to be supplied to the micromirror devices 3a and 3b to perturb the mirrors 230 are set in advance. Each perturbation voltage range is divided by a series of driving points formed from several points (four points in FIGS. 2A and 2B). The voltages of the driving points are sequentially supplied to the micromirror devices 3a and 3b to perturb the mirrors 230, thereby searching for the optimum driving voltages. More specifically, the driving voltage to be supplied to the micromirror device 3a is fixed to one driving point. In this state, the driving voltage of each driving point is supplied to the micromirror device 3b to perturb the mirrors 230. This operation is performed for each driving point of the micromirror device 3a so that the mirrors 230 of the micromirror devices 3a and 3b are perturbed in all combination of the driving points of the micromirror devices 3a and 3b. A combination of the driving points of the micromirror devices 3a and 3b at which an optimum output light power is obtained is searched for based on the measurement results of the output light measuring device 4 in all combinations of the driving points upon the perturbation. The driving voltages of the driving points are detected as optimum driving voltages.

The correction unit 53 corrects the LUT 54b (to be described later) based on the optimum driving voltages detected by the detection unit 52.

The storage unit 54 stores various kinds of information about the operation of the control device 5 and includes at least initial information 54a and the LUT 54b.

The initial information 54a includes the initial LUT 54b which is not corrected yet by the correction unit 53, and information about, e.g., the arrangement of the micromirror devices 3a and 3b in the micromirror arrays 2a and 2b.

The LUT 54b is formed from a table which stores, in correspondence with each connection path of the input port 1a and output port 1b, driving voltage values to make the mirrors 230 pivot to pivot angles necessary for implementing the connection path between the micromirror devices 3a and 3b associated with the connection path. FIG. 3 shows an example of the LUT 54b. As shown in FIG. 3, the LUT 54b has a matrix structure in which the records of the micromirror devices 3a included in the micromirror array 2a are represented by A, B, C, D, E, F, . . . on the rows, and the records of the micromirror devices 3b included in the micromirror array 2b are represented by $\alpha, \beta, \gamma, \delta, \epsilon, \xi, \ldots$ on the columns. The field of an intersection between a row-direction record and a column-direction record stores the driving voltage values of the mirrors 230 of the corresponding micromirror devices 3a and 3b. The fields each representing a connection path are assigned identification numbers 1, 2, 3, . . . . For example, connection path 23 represents the connection path of micromirror devices C and $\gamma$. The field with identification number 23 in the LUT 54b stores driving voltage values to drive the mirrors 230 of the micromirror devices C and $\gamma$ to pivot angles necessary for implementing the connection path. In the example shown in FIGS. 16 and 17, one micromirror device includes four electrodes 340a to 340d. The LUT 54b therefore stores eight driving voltage values in the field of one connection path.

<Operation of Optical Switch>

Figure 4:
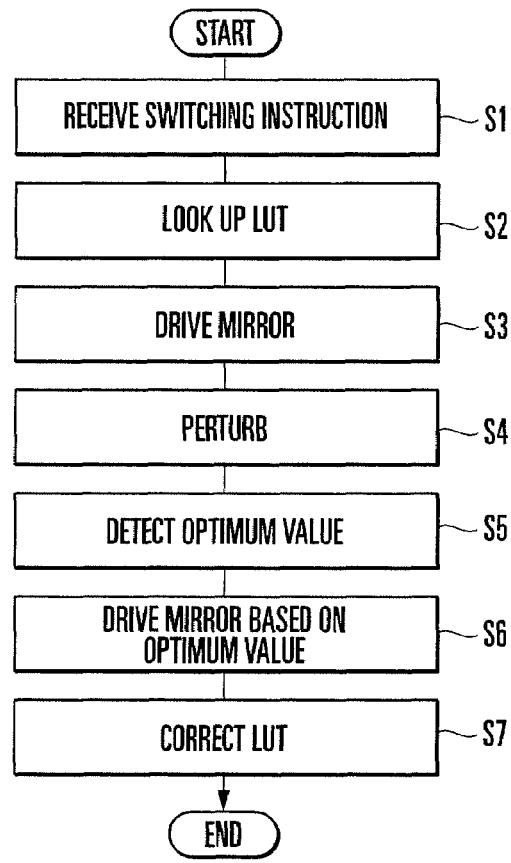
FIG. 4 is a flowchart illustrating the operation of the optical switch according to the first embodiment of the present invention.

The operation of the optical switch according to this embodiment will be described next with reference to FIG. 4. First, an instruction is received to perform a so-called switching operation of receiving an external optical signal input to a predetermined input port 1a and outputting it from a predetermined output port 1b (step S1). The driving unit 51 acquires the driving voltage values of the micromirror devices 3a and 3b necessary for a connection path corresponding to the instruction by looking up the LUT 54b (step S2).

Upon acquiring the driving voltage values, the driving unit 51 supplies the driving voltages to the corresponding micromirror devices 3a and 3b to make the mirrors 230 pivot (step S3). The optical signal input to the predetermined input port 1a is reflected by the mirrors 230 of the micromirror devices 3a and 3b and output from the predetermined output port 1b. The switching operation is thus performed.

When the above-described switching operation is performed, the detection unit 52 outputs, to the driving unit 51, an instruction to perturb the mirrors 230 of the micromirror devices 3a and 3b necessary for the connection path of the switching operation. The driving unit 51 gives a very small voltage variation which changes periodically to the driving voltages to slightly perturb (vibrate) the mirrors 230 (step S4).

When the perturbation is performed, the detection unit 52 detects driving voltages at which an optimum output light power is obtained, based on the power of output light from the output port 1b during the perturbation, which is measured by the output light measuring device 4 (step S5).

Upon detecting the optimum driving voltages, the detection unit 52 supplies them to the corresponding micromirror devices 3a and 3b via the driving unit 51 (step S6). With this operation, the mirrors 230 of the micromirror devices 3a and 3b included in the connection path are controlled to angles at which the power of light output from the output port 1b is optimized. The optimum output light power means an output light power at which the optical loss of input light is minimized, or a desired output light power based on a request from the system. Driving voltages which implement mirror pivot angles at which such an output light power is obtained will be referred to as optimum driving voltages.

At this time, the correction unit 53 corrects the LUT 54b based on the detected driving voltages (step S7). The correction operation will be described below. Connection path 23 of the micromirror devices C and $\gamma$ in FIG. 3 will be exemplified below. The field corresponding to connection path 23 in the LUT 54b stores $V_{C23}$ as the driving voltage value of the micromirror device C and $V_{\gamma 23}$ as the driving voltage value of the micromirror device $\gamma$. $V_{C23}$ and $V_{\gamma 23}$ generically represent driving voltage values to be applied to the electrodes 340a to 340d of the micromirror devices C and $\gamma$, respectively, for the descriptive convenience.

For example, when the driving voltage values of an arbitrary connection path detected by the detection unit 52, at which an optimum output light power is obtained, are different from those of the arbitrary connection path stored in the LUT 54b, the correction unit 53 corrects the driving voltage values in the LUT 54b. Assume that the detection unit 52 detects $V_{C23}'$ and $V_{\gamma 23}'$ as the optimum driving voltages of the micromirror devices C and $\gamma$. In this case, the correction unit 53 replaces the driving voltage values $V_{C23}$ and $V_{\gamma 23}$ stored in the field of connection path 23 in the LUT 54b with $V_{C23}'$ and $V_{\gamma 23}'$. In this way, the driving voltage values of the mirrors 230 stored in the LUT 54b are updated every time optimum driving voltages are detected. Even when the optimum driving voltages change due to mirror drift or a change in the environment such as temperature, the device can follow the change. It is therefore possible to drive the mirrors to optimum pivot angles.

Note that when the driving voltage values of one connection path are corrected, the driving voltage values of the remaining connection paths may be corrected. This correction can be done based on either the differences between driving voltage values stored in the initial LUT 54b and optimum driving voltages detected by the detection unit 52, or the positions of the micromirror devices 3a and 3b in the micromirror arrays 2a and 2b. Both methods will be described below.

For correction based on differences, the correction unit 53 calculates the difference between the optimum driving voltage and the driving voltage value stored in the LUT 54b for each of the micromirror devices 3a and 3b as the optimum driving voltage detection targets concerning the connection path. The differences are added to the driving voltage values stored in the LUT 54*b* in correspondence with the remaining connection paths of the micromirror devices 3*a* and 3*b*. Assume that the driving voltage value $V_{C23}$ of the connection path of the micromirror device C stored in the field of connection path 23 in the LUT 54*b* shown in FIG. 3 is replaced with $V_{C23}'$. At this time, the correction unit 53 adds the difference $\Delta V_{C23}$ ($\Delta V_{C23} = V_{C23}' - V_{C23}$) between $V_{C23}$ and $V_{C23}'$ to the driving voltage values of the remaining connection paths of the micromirror device C, i.e., the driving voltage values of the micromirror device C stored in the fields of driving voltage values 21, 22, 24, 25, . . . . This makes it possible to drive the mirrors to optimum pivot angles even when predetermined error voltages are supposed to be generated in the electrodes 340*a* to 340*d* of the micromirror devices due to, e.g., mirror drift.

Figure 5:
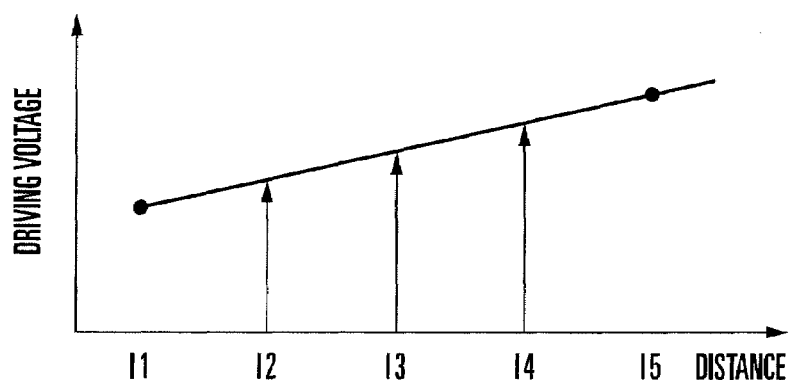
FIG. 5 is a graph for explaining interpolation.
Figure 6:
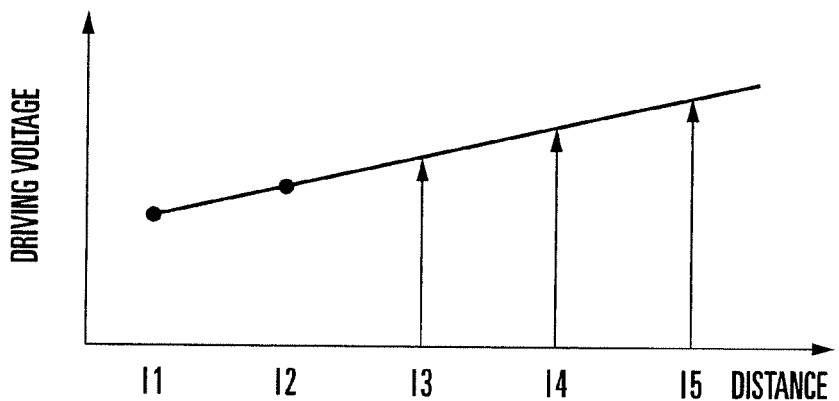
FIG. 6 is a graph for explaining extrapolation.

For correction based on positions, the correction unit 53 performs interpolation or extrapolation in accordance with the geometric positions of the micromirror devices 3*a* and 3*b* as the optimum driving voltage detection targets in the micromirror arrays 2*a* and 2*b*, thereby correcting the driving voltages of the other micromirror devices 3*a* and 3*b* in the micromirror arrays. The interpolation and extrapolation will be described here with reference to FIGS. 5 and 6. FIGS. 5 and 6 show the driving voltage and the direct distance of the micromirror devices 3*a* and 3*b* in the micromirror arrays 2*a* and 2*b* or the distance in an arbitrary direction.

Assume that the driving voltages of micromirror devices at distances l1 and l5 in the micromirror array 2*a* are detected, as shown in FIG. 5. In this case, based on the slope of the straight line passing through the two driving voltage values, the driving voltage values of the micromirror devices located between the distances l1 and l5, i.e., the micromirror devices at distances l2 to l4 are calculated by interpolation.

Assume that the driving voltages of micromirror devices at the distances l1 and l2 in the micromirror array 2*a* are detected, as shown in FIG. 6. In this case, based on the slope of the straight line passing through the two driving voltage values, the driving voltage values of the micromirror devices located outside the distances l1 and l2, i.e., the micromirror devices at the distances l3 to l5 are calculated by extrapolation.

Hence, for correction based on positions, the optimum driving voltages of at least two micromirror devices in a micromirror array are necessary. Driving voltage correction by the above-described method allows to drive the mirrors to optimum pivot angles even when a mirror substrate 200 thermally expands. A mirror pivot angle and a driving voltage have a nonlinear relationship. Considering the nonlinearity, interpolation or extrapolation may be performed using not only a straight line but also a curve such as a multi-order function.

Figure 7A:
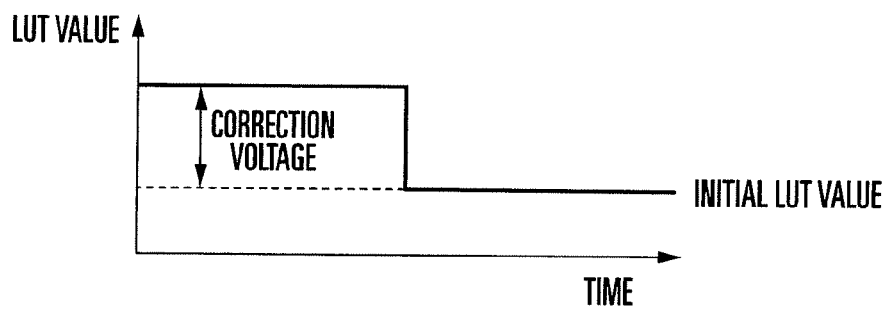
FIG. 7A is a timing chart for explaining a correction voltage correction method.
Figure 7B:
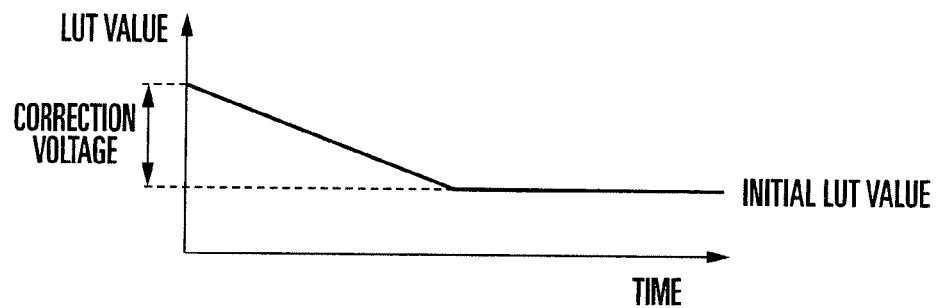
FIG. 7B is a timing chart for explaining a correction voltage correction method.
Figure 7C:
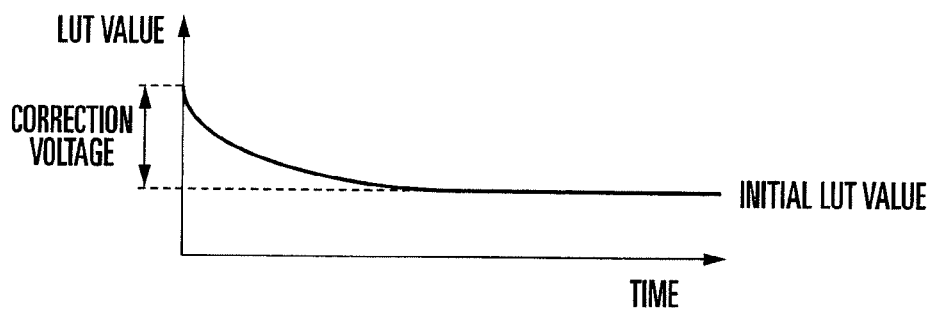
FIG. 7C is a timing chart for explaining a correction voltage correction method.

Upon receiving a switching instruction again (step S1) after correction of the LUT 54*b* (step S7), the driving unit looks up the corrected LUT 54*b* (step S2). The time from correction of the LUT 54*b* in step S7 to lookup of the LUT 54*b* in step S2 largely changes depending on the switching instruction interval. It may be as long as one year or more in some cases. Since the correction voltages are corrected in consideration of the influence of a change in the environment, the correctness of the correction voltages in the LUT 54*b* are assumed to degrade along with the elapse of time. Additionally, if a mirror pivot angle error is generated due to accumulation of charges in the stray capacitance, stop of applying voltage causes discharge over a course of time, and its influence also decreases along with the elapse of time. Hence, the effects of the correction voltages, i.e., the values of the correction voltages may be decreased over a period of time. The degree of decrease may be set by giving a voltage value to correct the initial LUT 54*b* as a function of elapsed time after optimum voltage detection. For example, correction may be done only when the elapsed time is equal to or shorter than a designated time, as shown in FIGS. 7A and 7B. Alternatively, the correction voltage may be exponentially decreased based on a designated time constant, as shown in FIG. 7C. This enables to set a more optimum correction voltage value.

As described above, according to the present invention, the detection unit 52 detects the optimum driving voltages of the micromirror devices 3*a* and 3*b*. The correction unit 53 corrects the driving voltage values in the LUT 54*b* based on the optimum driving voltages. This makes it possible to drive the mirrors 230 to optimum pivot angles even when the optimum pivot angles of the mirrors 230 change due to the drift of the mirrors 230 or a change in the environment such as temperature.

The initial LUT 54*b* contained in the initial information 54*a* is conventionally created based on the geometric relationship between the micromirror devices and the voltage vs. angle characteristic of the mirrors 230. In some cases, however, the optimum driving voltages or values close to them are not obtained. In this case, the optimum driving voltages of some micromirror devices 3*a* and 3*b* in the micromirror arrays 2*a* and 2*b* may be detected by the method in steps S4 and S5, and those of the remaining micromirror devices 3*a* and 3*b* may be estimated based on the above-described differences or positions. This simplifies the operation of creating the LUT 54*b* and allows to obtain driving voltages more optimum than before or values close to them.

In this embodiment, the initial LUT 54*b* and the updated LUT 54*b* are recorded. In place of the updated LUT 54*b*, the differences between the values in the initial LUT 54*b* and the optimum driving voltages detected by the detection unit 52 for the micromirror devices 3*a* and 3*b* may be recorded. In this case, the correction unit 53 detects, from the initial LUT 54*b*, the driving voltage values of the micromirror devices 3*a* and 3*b* of a connection path, and adds the differences of the micromirror devices 3*a* and 3*b* of the connection path to the values, thereby correcting the driving voltage values. The driving unit 51 supplies the corrected values to the corresponding micromirror devices 3*a* and 3*b*. Even when the optimum driving voltages change due to mirror drift or a change in the environment such as temperature, the device can follow the change. It is therefore possible to drive the mirrors to optimum pivot angles. Furthermore, since the amount of recorded data can be smaller than in the arrangement having the updated LUT 54*b*, the hardware resource can be saved.

Second Embodiment

The second embodiment of the present invention will be described next. The same names and reference numerals as in the above-described first embodiment and "Background Art" described with reference to FIGS. 15 to 17 denote the same constituent elements in this embodiment, and a description will be omitted as needed.

In a conventional micromirror device, when voltages are applied to the electrodes 340*a* to 340*d*, the electrodes 340*a* to 340*d* themselves or the insulating layer 311 around them is sometimes polarized or charged. As the charges are gradually removed or accumulated, the potential differences between the mirrors 230 and the electrodes 340*a* to 340*d* vary over a course of time. This may change the tilt angles of the mirrors 230 along with the elapse of time, i.e., cause pivot angle drift.

Figure 18:
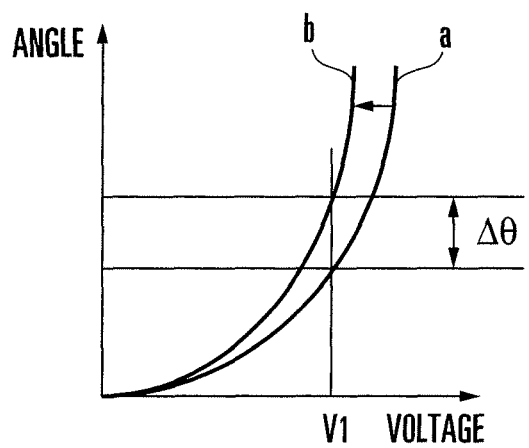
FIG. 18 is a graph showing the relationship between a mirror tilt angle and a driving voltage.

For example, when the relationship between the pivot angle of the mirror 230 and the driving voltages of the electrodes 340a to 340d shifts from a curve a to a curve b, as shown in FIG. 18, the pivot angle increases by Δθ after generation of pivot angle drift even when an applied driving voltage $V_1$ remains unchanged.

When pivot angle drift occurs, the tilt pivot angle of the mirror 230 changes. For this reason, the output light power may decrease, or it may be impossible to drive the mirror 230 to a desired pivot angle even when the same driving voltage is applied. This embodiment has as another object to reduce the influence of pivot angle drift and suppress reduction of the output light power.

<Arrangement of Optical Switch>

Figure 10:
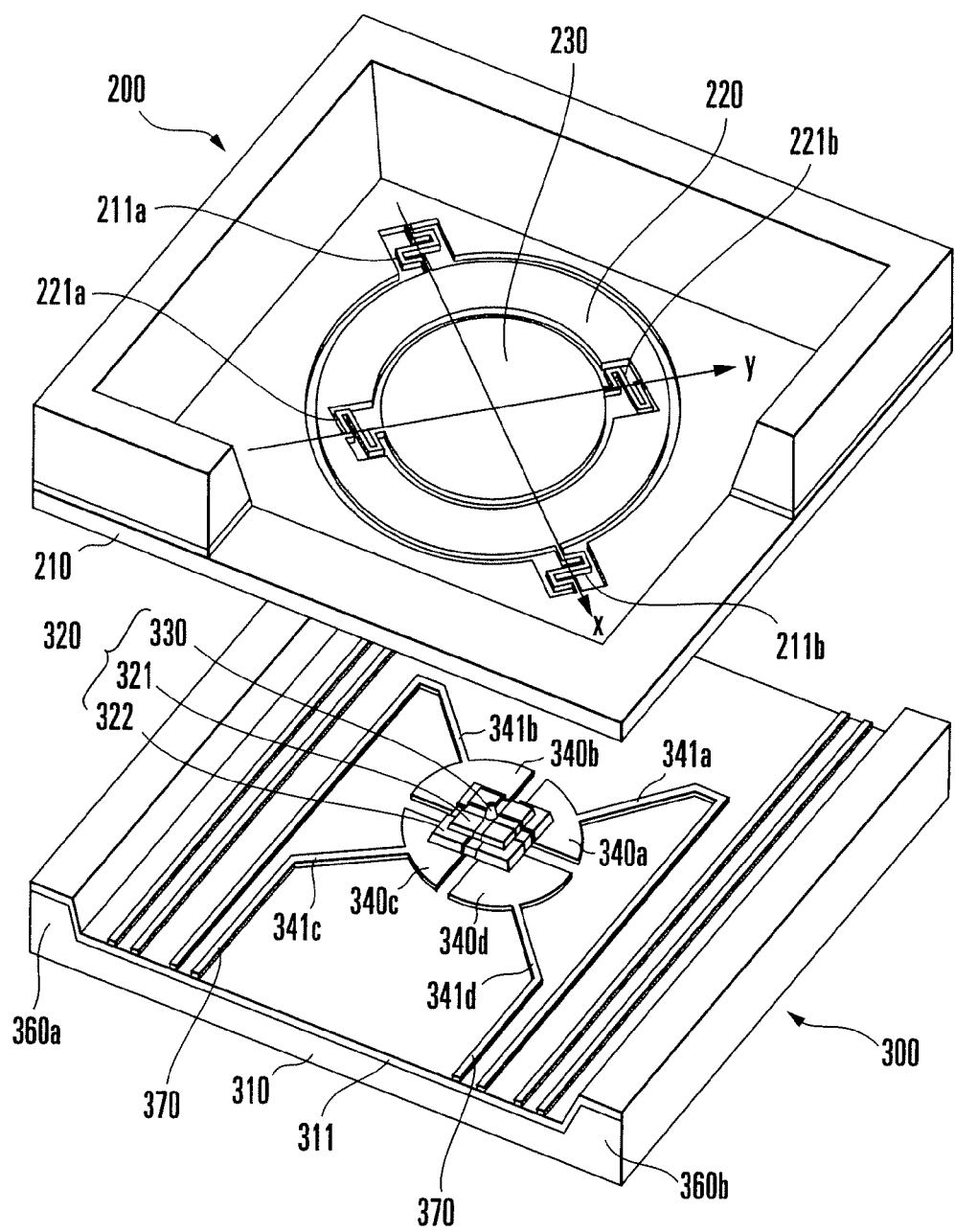
FIG. 10 is a perspective view schematically showing the arrangement of a micromirror device.

As shown in FIG. 10A, an optical switch according to this embodiment includes an input port 1a, output port 1b, input-side micromirror device 3a, output-side micromirror device 3b, and control device 5.

The control device 5 supplies driving voltages to the micromirror devices 3a and 3b to tilt mirrors 230 to predetermined angles. The control device 5 includes a driving unit 51, storage unit 54, and error correction unit 55, as shown in FIG. 8B.

The driving unit 51 acquires, based on an external switching instruction, the driving voltage values of the micromirror devices 3a and 3b necessary for a connection path corresponding to the instruction by looking up an LUT (Look Up Table) 54b stored in the storage unit 54, and supplies the driving voltages to the corresponding micromirror devices 3a and 3b, thereby tilting the mirrors 230 to predetermined pivot angles.

The storage unit 54 stores various kinds of information about the operation of the control device 5 and includes at least initial information 54a and the LUT 54b.

The initial information 54a includes information about, e.g., the arrangement of the micromirror devices 3a and 3b in the micromirror arrays 2a and 2b.

The LUT 54b is formed from a table which stores, in correspondence with each connection path of the input port 1a and output port 1b, driving voltages to drive the mirrors 230 to necessary pivot angles for the micromirror devices 3a and 3b necessary for implementing the connection path.

The error correction unit 55 corrects the driving voltages supplied from the driving unit 51 in accordance with occurrence of pivot angle drift. The principle of error correction by the error correction unit 55 will be described later.

<Principle of Error Correction>

Figure 9:
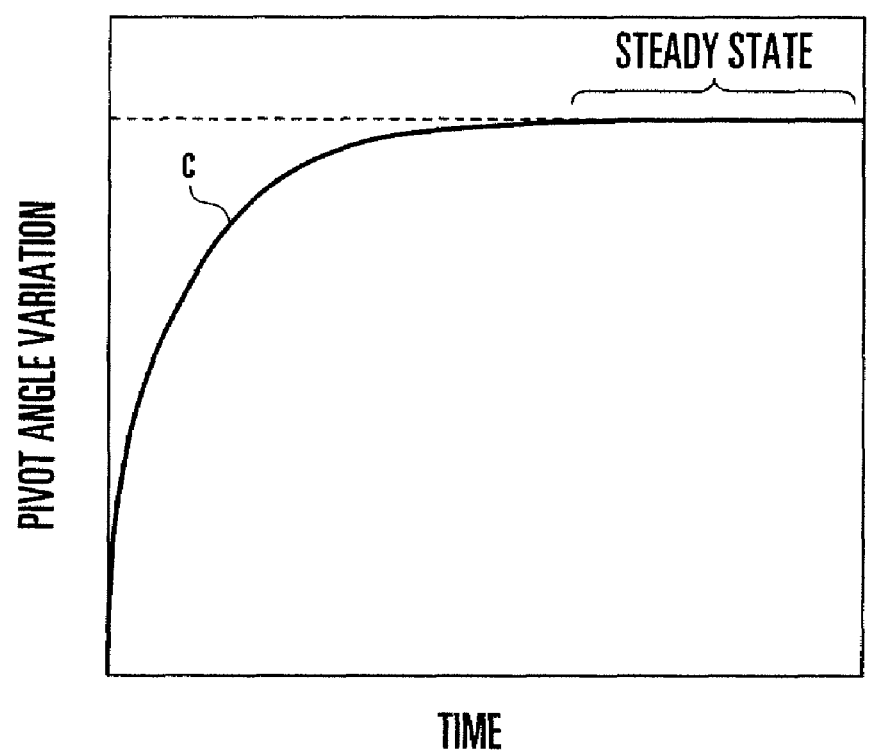
FIG. 9 is a timing chart showing the relationship between time and a pivot angle variation.

When voltages are applied to the micromirror devices 3a and 3b, the tilt angles of the mirrors 230 vary along with the elapse of time. That is, pivot angle drift occurs. The pivot angle drift increases the change in the pivot angles of the mirrors 230 over a period of time, as indicated by c in FIG. 9. However, the amount of the pivot angle change caused by the pivot angle drift is saturated at a certain amount and then shifts to a steady state after the elapse of a predetermined time.

The pivot angle drift are supposed to occur due to various reasons. One of the reasons is the influence of floating charges generated by, e.g., charge around the electrodes. If floating charges are generated around the electrodes, the charges attract the mirror 230, and its pivot angle changes. The tendency of the charge generally slowly changes over several hrs, although it changes depending on the structure or manufacturing method of the micromirror device. Since the mirror 230 is attracted by the charges, the voltage applied to the electrodes apparently increases. Hence, the pivot angle drift is regarded to be caused by the voltage drift of each electrode.

The steady state of voltage drift (to be referred to as a voltage drift amount hereinafter) is almost proportional to the magnitude of the voltages applied to the electrodes. Hence, the voltage drift amount of the mirror 230 can have a value which changes between electrodes 340a to 340d. Let ΔVmax be the voltage drift amount generated in a driving electrode when a maximum driving voltage necessary for a maximum pivot angle necessary for the optical switch is applied. When the LUT 54b is created in the initial state without voltage drift, the initial value of the voltage drift amount is 0. The voltage drift amount based on the LUT 54b ranges from 0 to ΔVmax. The maximum error generated by the voltage drift amount is ΔVmax.

When a voltage ½ the maximum driving voltage of the optical switch is applied to the electrodes 340a to 340d for a predetermined time until voltage drift is set in the steady state, a voltage drift amount ΔVmax/2 is generated. When the LUT 54b is created in this state, each voltage recorded in the LUT 54b already contains a voltage corresponding to the voltage drift amount ΔVmax/2. Hence, the voltage drift amount based on the LUT 54b ranges from −0.5ΔVmax to 0.5ΔVmax. The maximum error generated by the voltage drift amount is 0.5ΔVmax. The maximum error can be ½ as compared to the LUT 54b created in advance without voltage drift. In this embodiment, the error correction unit 55 corrects pivot angle drift, i.e., voltage drift based on the above-described principle. When the LUT 54b is created in advance based on the corrected values, the LUT 54b containing smaller errors caused by voltage drift can be created.

<Switching Operation>

The switching operation of the optical switch will be described next. In the switching operation, the control device 5 of the optical switch causes the driving unit 51 to look up the voltage values recorded in the LUT 54b and apply them to the electrodes 340a to 340d, thereby changing the tilt angles of the mirrors 230 and switching the connection path. At this time, since apparent extra voltages by voltage drift are applied to the electrodes 340a to 340d, each mirror 230 pivots with a pivot angle error. The pivot angle error causes an optical power loss. It is therefore necessary to correct the voltage drift amount.

The pivot angle error of the mirror 230 by voltage drift is generated not only during the switching operation but also when path connection is being maintained. Hence, correction is always necessary even during connection. A correction method has been proposed, which calculates an error correction voltage to correct the pivot angle error of the mirror 230 based on an optical power variation upon perturbing the mirror 230. When the error correction voltage is subtracted from the driving voltage using this method, the pivot angle of each pivot axis can be corrected to a desired value. Even during the switching operation, the influence of angle drift can be reduced by using the error correction voltage.

The pivot angle error correction method will be described. In the optical switch having the arrangement shown in FIG. 10, two electrodes control one pivot axis. The two rotation axes of the mirror are defined as an x-axis and a y-axis. The electrodes 340a ad 340c control the x-axis. The electrodes 340b ad 340d control the y-axis. The pivot angle error of the mirror 230 in the x-axis direction can be corrected by the voltages applied to the two electrodes 340a and 340c. Although the magnitude of voltage drift changes between the electrodes depending on the applied voltage, the pivot angle error of the mirror 230 in the x-axis direction can be corrected by changing either of the voltages applied to the electrodes 340a and 340c. More specifically, even when the pivot angle of the mirror 230 can be corrected to an optimum value, the voltage drift amounts of the two electrodes do not necessarily match the error correction voltages to be applied to the electrodes. It is therefore necessary to execute correction to make the error correction voltages always match the voltage drift amounts.

When the mirror 230 pivots about the x-axis or y-axis, the driving unit 51 applies differential driving voltages centered around a common bias voltage to the electrodes arranged symmetrically with respect to the pivot axis. For example, let Vx be the operating voltage about the x-axis, V1 and V2 be the voltages to be applied to the two electrodes associated with the rotation about the x-axis, Vy be the operating voltage about the y-axis, and V3 and V4 be the voltages to be applied to the two electrodes associated with the rotation about the y-axis. The driving unit 51 corrects the voltages to be applied to the electrodes in the following way.

$$V1 = V_{bias} + Vx \quad (1)$$

$$V2 = V_{bias} - Vx \quad (2)$$

$$V3 = V_{bias} + Vy \quad (3)$$

$$V4 = V_{bias} - Vy \quad (4)$$

When the voltages represented by equations (1) to (4) are applied to the electrodes, the electrodes which are arranged symmetrically with respect to each pivot axis always differentially operate. Hence, the voltage drift amounts of the electrodes are also generated differentially. The error correction unit 55 adds, to the operating voltages, error correction voltages corresponding to the voltage drift amounts of the respective electrodes, thereby suppressing the increase in the optical power loss caused by the mirror pivot angle error during the switching operation.

Figure 11:
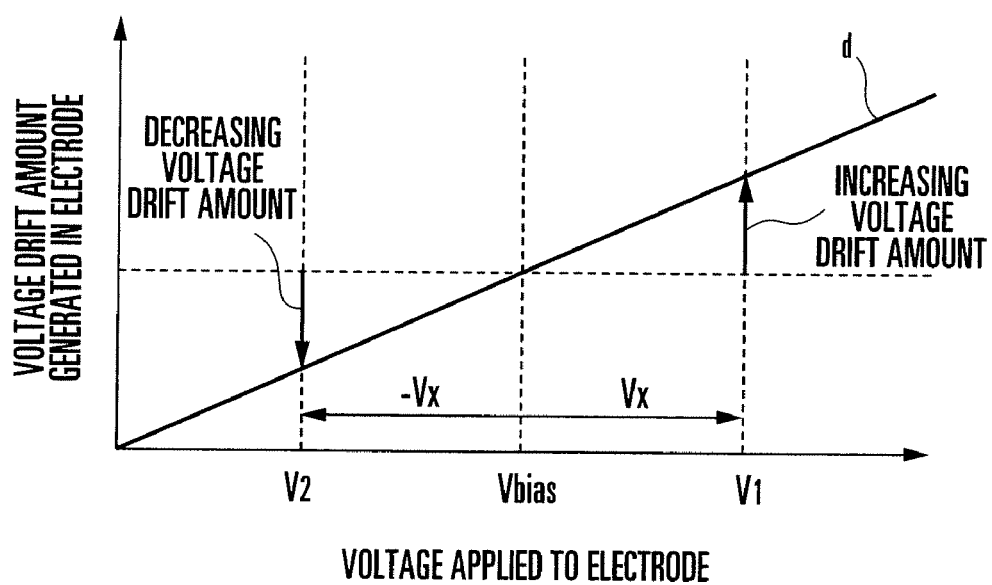
FIG. 11 is a graph showing the relationship between a voltage and a voltage drift amount.

At this time, the common bias voltage $V_{bias}$ is applied to all electrodes for a predetermined time to obtain the steady state. After that, the LUT 54b is created, thereby creating the LUT 54b in which errors caused by voltage drift are corrected. As indicated by d in FIG. 11, the voltage drift is almost proportional to the voltage applied to an electrode. It is therefore possible to generate differential drift amounts for the two electrodes based on the point at which the steady state is obtained by applying $V_{bias}$ for a predetermined time, and almost accurately grasp the voltage drift amount of each electrode. Use of the LUT 54b created in this way allows to halve the influence of drift. Additionally, applying an error correction voltage corresponding to the voltage drift amount of each electrode enables to suppress the increase in the optical power loss caused by the mirror pivot angle error during the switching operation.

Figure 16:
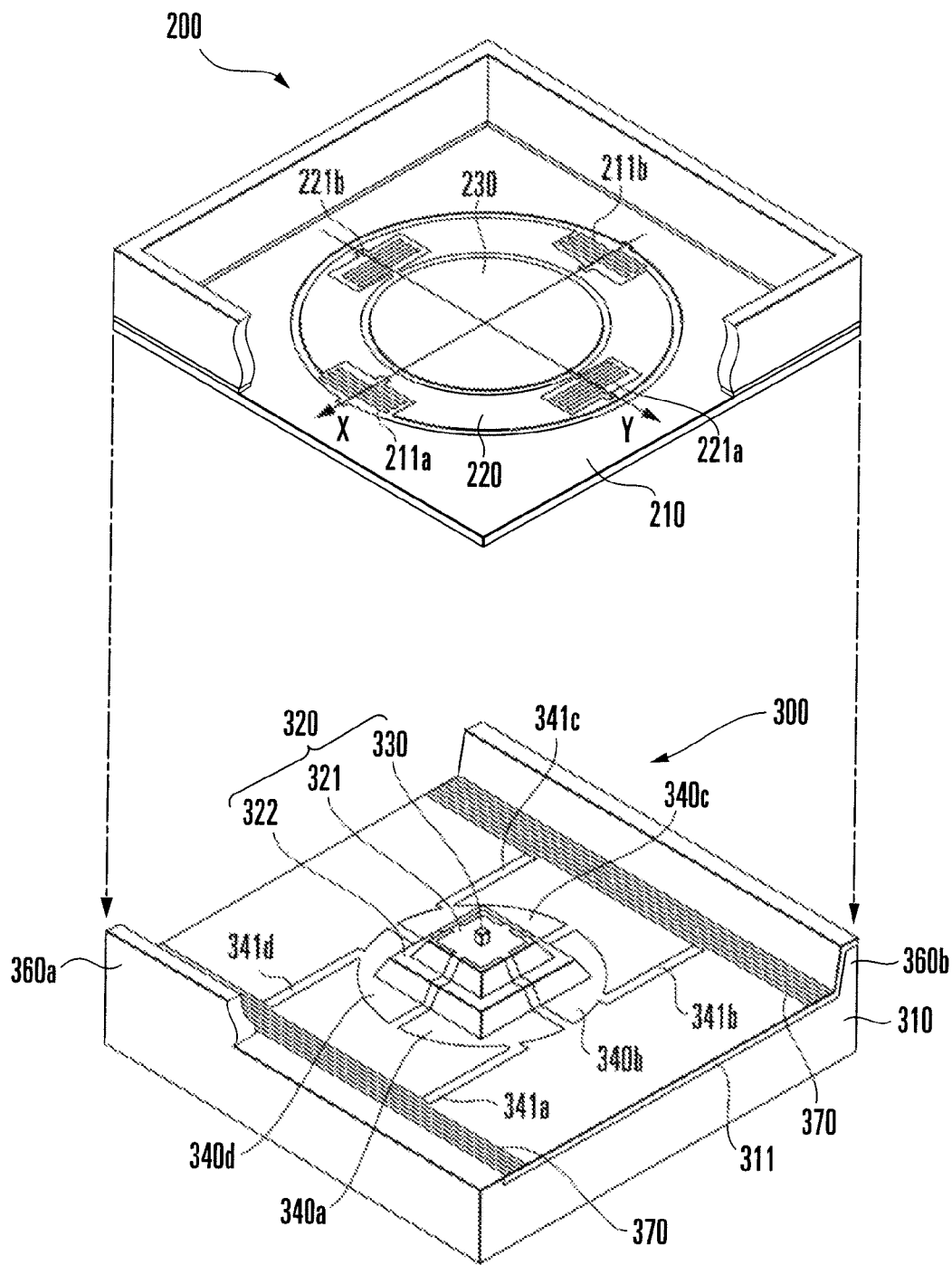
FIG. 16 is a perspective view schematically showing the arrangement of a micromirror device.
Figure 17:
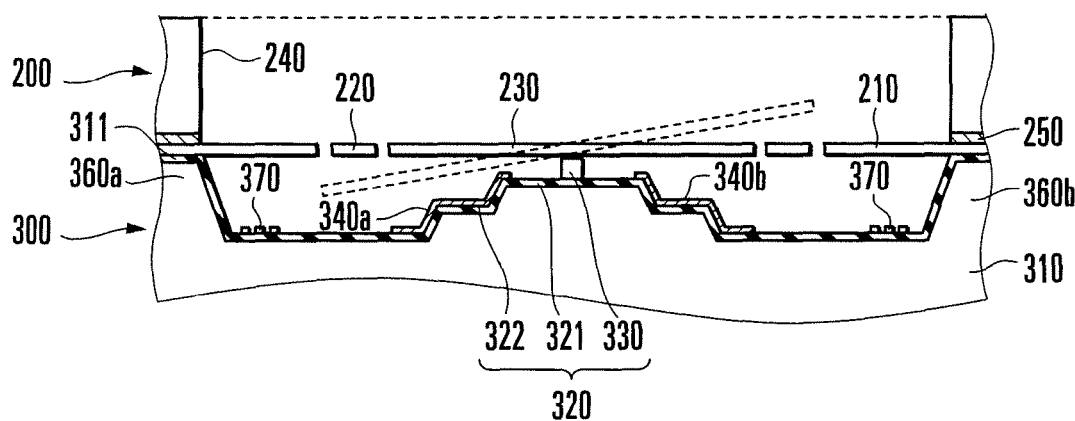
FIG. 17 is a sectional view schematically showing the arrangement of the micromirror device.

The above-described pivot angle error correction method is usable for correction using the same principle even in a micromirror device having an arrangement as shown in FIG. 16 in which the pivot axes of the mirror 230 match the parting lines of the electrodes 340a to 340d.

In this embodiment, an optical switch without the output light measuring device 4, the detection unit 52, and the correction unit 53 of the first embodiment has been explained for the sake of simplicity. In this embodiment, however, the output light measuring device 4, the detection unit 52, and the correction unit 53 of the first embodiment may be provided, as a matter of course. This implements the same functions and effects as in the first embodiment.

Third Embodiment

The third embodiment of the present invention will be described next. In this embodiment, a function of creating an LUT 54b is added to the above-described second embodiment. The same names and reference numerals as in the above-described second embodiment denote the same constituent elements in this embodiment, and a description will be omitted as needed.

<Arrangement of Optical Switch>

Figure 12A:
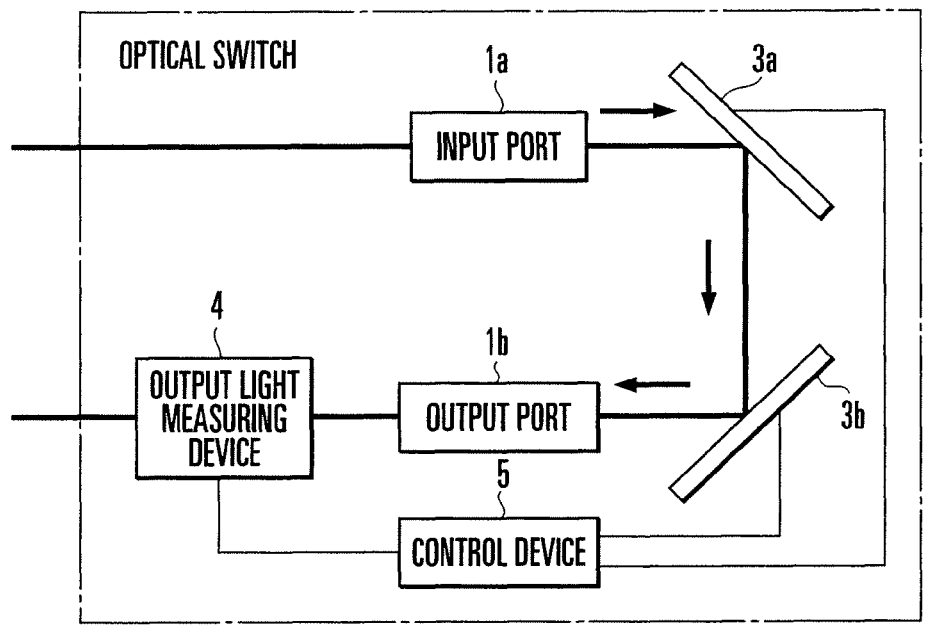
FIG. 12A is a block diagram schematically showing the arrangement of an optical switch according to the third embodiment of the present invention.

As shown in FIG. 12A, an optical switch according to this embodiment includes an input port 1a, output port 1b, input-side micromirror device 3a, output-side micromirror device 3b, output light measuring device 4, and control device 5.

The output light measuring device 4 detects the intensity of output light which has exited from the output port 1b and converts it into an electrical signal. The output light measuring device 4 can have an arrangement for extracting part of output light and measuring the output light intensity using a light-receiving element such as a photodiode.

Figure 12B:
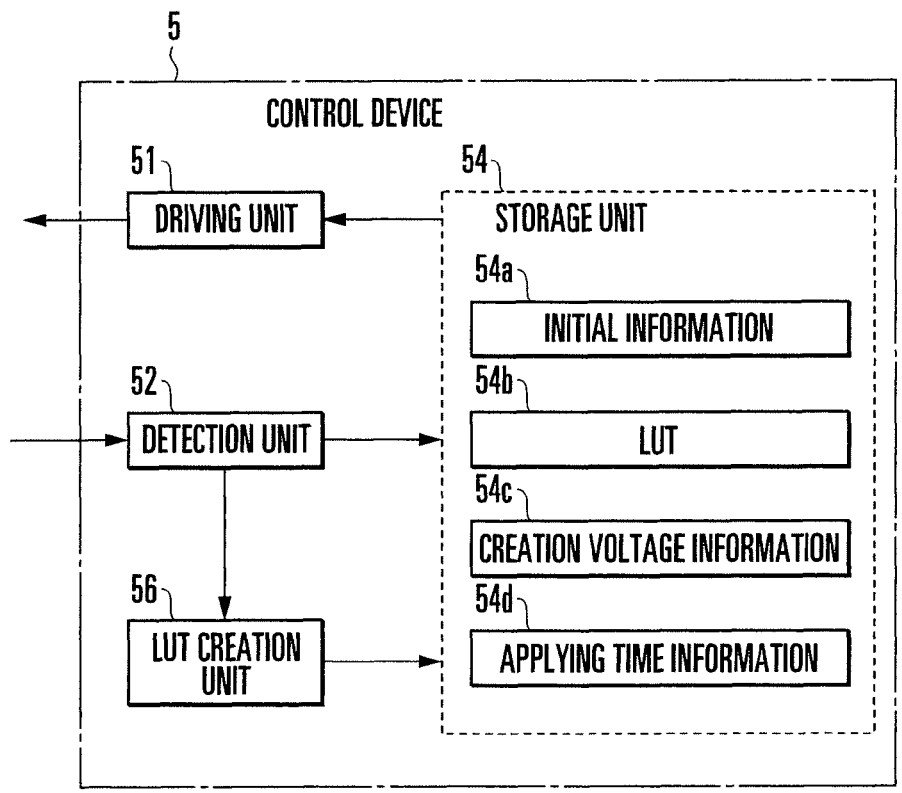
FIG. 12B is a block diagram schematically showing the arrangement of a control device.

The control device 5 supplies driving voltages to the micromirror devices 3a and 3b to tilt mirrors 230 to predetermined angles. The control device 5 also creates, using the data of output light intensity measured by the output light measuring device 4, the LUT 54b which maximizes the light intensity of a connection path. The control device 5 includes a driving unit 51, detection unit 52, storage unit 54, and LUT creation unit 56, as shown in FIG. 12B.

The storage unit 54 stores various kinds of information about the operation of the control device 5 and includes at least initial information 54a, the LUT 54b, creation voltage information 54c, and applying time information 54d. The creation voltage information 54c is information about voltages (to be referred to as creation voltages hereinafter) to be applied to micromirror devices to create the LUT 54b. The applying time information 54d is information about a time (to be referred to as an "applying time" hereinafter) of creation voltage applying for creation of the LUT 54b.

After causing the driving unit 51 to apply voltages to the micromirror devices 3a and 3b while referring to the creation voltage information 54c and applying time information 54d, the LUT creation unit 56 creates the LUT 54b by causing the driving unit 51 to apply driving voltages to the micromirror devices 3a and 3b while referring to the data of output light intensity measured by the output light measuring device 4.

<LUT Creation Operation>

The operation of creating the LUT 54b will be described next.

First, the LUT creation unit 56 acquires creation voltages by referring to the creation voltage information 54c stored in the storage unit 54, and applies them to all electrodes of micromirror devices to be driven. The LUT creation unit 56 also acquires an applying time by referring to the applying time information 54d stored in the storage unit 54. After maintaining the creation voltage applied state up to the time specified by the applying time, the LUT creation unit 56 immediately creates the LUT 54b. Creation of the LUT 54b is done by searching for a value at which the output light intensity of a connection path of interest acquired from the detection unit 52 is maximized while adjusting the voltage values to be applied to electrodes 340a to 340d.

If there is a micromirror device that is not involved in creation of the LUT 54b, the creation voltage is preferably continuously applied to the micromirror device. This is because without applying the voltage, the voltage drift amount of each micromirror device gradually returns to zero.

Figure 13:
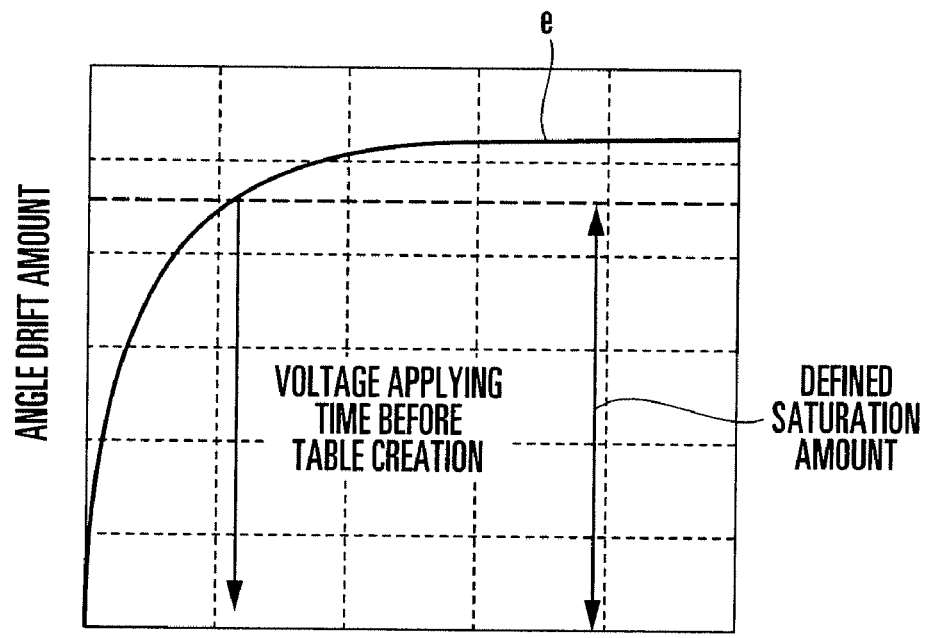
FIG. 13 is a graph showing an applying time setting method.

How to set the applying time information stored in the creation voltage information 54c will be described. The applying time is set based on the pivot angle drift amount which changes over a course of time upon tilting the mirror 230, as indicated by e in FIG. 13. More specifically, a value at which the pivot angle drift amount, i.e., voltage drift amount is saturated and set in the steady state is defined in advance. The time until the voltage drift reaches this value is measured, and the measured time is set as the applying time.

Figure 14:
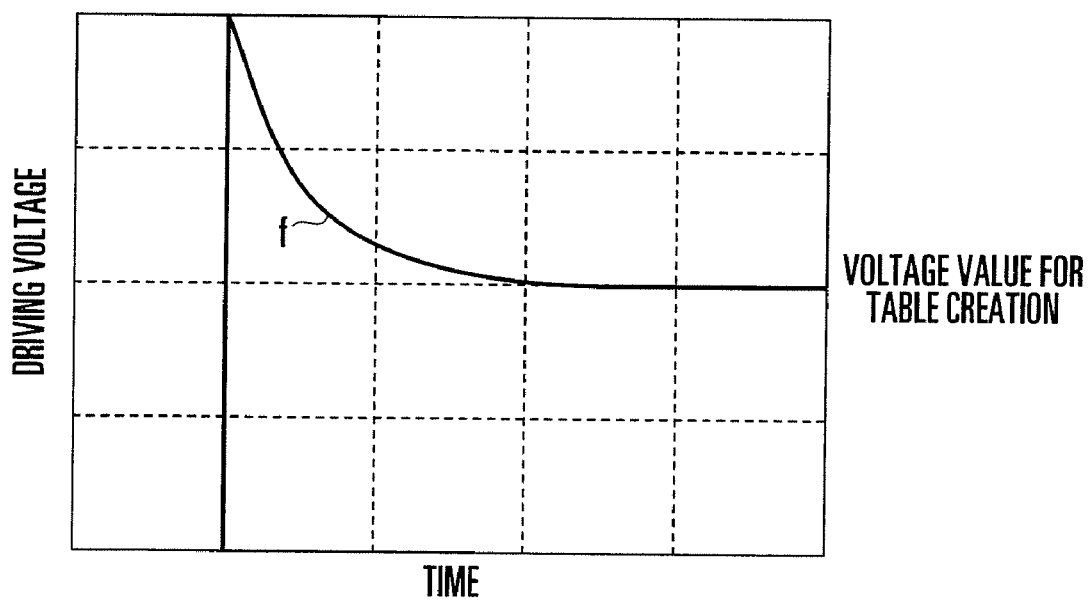
FIG. 14 is a graph showing another applying time setting method.

The voltage drift more quickly advances as the applied voltage rises. This characteristic may be used to set the applying time. More specifically, voltages higher than the creation voltages are applied to the electrodes 360a to 360d, and the values are gradually decreased, as indicated by f in FIG. 14. This causes voltage drift in a short time. It is therefore possible to quickly detect the value at which the voltage drift changes to the steady state, and consequently, to set the applying time in a short time.

As described above, according to this embodiment, the LUT 54*b* is created while taking a pivot angle error generated by pivot angle drift or the like into consideration in advance. This makes it possible to reduce the pivot angle error of a mirror and suppress the optical power variation of the switch.

In this embodiment, an optical switch without the correction unit 53 of the first embodiment has been explained for the sake of simplicity. In this embodiment, however, the correction unit 53 may be provided, as a matter of course. This implements the same functions and effects as in the first embodiment.

The LUT 54*b* created in this embodiment may be applied to the above-described first and second embodiments, as a matter of course.

The invention claimed is:

1. An optical switch comprising:
   at least one input port which inputs input light;
   at least one output port which outputs output light;
   a mirror array including a plurality of mirror devices, wherein said plurality of mirror devices each includes a pivotally supported mirror and electrodes opposite the mirror, said mirror and electrodes being arranged so that driving voltages applied to the electrodes act to cause the mirror to tilt to a predetermined angle;
   a look-up table which records, in correspondence with each combination of said input port and said output port, the driving voltages to tilt the mirror to a pivot angle at which the input light from said one input port is deflected and output from said one output port;
   a driving unit for selectively outputting, from an arbitrary one of said at least one output port, the input light input to a predetermined one of said at least one input port by supplying the driving voltages to said mirror device obtained from said look-up table;
   detection unit for detecting the driving voltages of the mirror at which power of the output light is optimized; and
   a correction unit that corrects, based on the driving voltages actually detected by said detection unit, the driving voltages recorded in said look-up table, wherein said correction unit corrects the driving voltages of a mirror device other than at least two mirror devices to which optimum driving voltages have been detected, on the basis of a geometrical positional relationship, within said mirror array, of said at least two mirror devices to said other mirror device.

2. An optical switch according to claim 1, wherein said correction unit corrects the driving voltages of the combination associated with said mirror device corresponding to the driving voltages detected by said detection unit.

3. An optical switch according to claim 1, wherein said correction unit performs correction based on differences between driving voltages recorded in said look-up table in an initial state and the driving voltages detected by said detection unit.

4. An optical switch according to claim 1, wherein based on driving voltages of predetermined input port and output port combinations, driving voltages of other combinations associated with said mirror device are set in said look-up table.

5. An optical switch according to claim 1, wherein said correction unit corrects said look-up table based on a difference between a time at which said detection unit has detected the driving voltages and a time at which said driving unit has accessed said look-up table to supply the driving voltages to said mirror device.

6. An optical switch according to claim 1, further comprising:
   an output light measuring device which measures the output light from said output port;
   a table creation unit for creating said look-up table to optimize the output light intensity measured by said output light measuring device; and
   a storage unit for storing creation voltage data about creation voltages to be applied to the electrodes when said table creation unit creates said table, and time data about a time of applying the creation voltages when creating said look-up table.

7. An optical switch comprising:
   at least one input port which inputs input light;
   at least one output port which outputs output light;
   a mirror device which includes a pivotally supported mirror and electrodes facing the mirror, and applies driving voltages to the electrodes to tilt the mirror to a predetermined angle;
   a look-up table which records, in correspondence with each combination of said input port and said output port, the driving voltages to tilt the mirror to a pivot angle at which the input light from said one input port is deflected and output from said one output port;
   a driving unit for selectively outputting, from an arbitrary one of said at least one output port, the input light input to a predetermined one of said at least one input port by supplying the driving voltages to said mirror device obtained from said look-up table;
   a detection unit for detecting the driving voltages of the mirror at which power of the output light is optimized; and
   a correction unit for correcting said table based on the driving voltages detected by said detection unit,
   wherein the driving voltages recorded in said table are driving voltages to output, from said output port, error correction voltage to compensate for errors caused by a voltage drift after a bias voltage is applied to all electrodes of said mirror device for a predetermined time to obtain a steady state.

8. An optical switch according to claim 7, wherein the predetermined time is a time from applying the driving voltages to said mirror device to saturation of pivot angle drift.

9. An optical switch according to claim 7, wherein the predetermined voltage has a value substantially not less than ½ of a maximum value of the driving voltage to output, from said output port, the input light from said input port.

10. An optical switch according to claim 7, wherein said electrode is divided into a plurality of electrodes, and the predetermined voltage has a value common to said plurality of electrodes which drive the mirror about an arbitrary pivot axis.

11. An optical switch according to claim 7, wherein said driving unit supplies the driving voltages based on said look-up table and a correction voltage value determined from a pivot angle drift amount.

\* \* \* \* \*